United States Patent
Murata et al.

(10) Patent No.: US 7,232,583 B2
(45) Date of Patent: Jun. 19, 2007

(54) METHOD FOR PREPARING ISOTHIOCYANATE(S) FROM CRUCIFEROUS PLANT MATERIAL

(75) Inventors: Mitsuyoshi Murata, Nagoya (JP); Isao H. C. Okunishi, Nagoya (JP); Yuji Ugai, Nagoya (JP); Hakusei Kobayashi, Nagoya (JP)

(73) Assignee: Kinjirushi Co., Ltd. (JP)

( * ) Notice: Subject to any disclaimer, the term of this patent is extended or adjusted under 35 U.S.C. 154(b) by 1032 days.

(21) Appl. No.: 10/234,839

(22) Filed: Sep. 5, 2002

(65) Prior Publication Data
US 2003/0064131 A1  Apr. 3, 2003

(30) Foreign Application Priority Data
Sep. 10, 2001  (JP) .............................. 2001-273112

(51) Int. Cl.
A23L 1/22 (2006.01)
A23L 1/212 (2006.01)
C12P 13/02 (2006.01)
C07C 291/10 (2006.01)

(52) U.S. Cl. .................. 426/49; 426/61; 426/615; 435/128; 558/302

(58) Field of Classification Search .............. 426/49, 426/61, 615; 435/128; 558/302
See application file for complete search history.

(56) References Cited

U.S. PATENT DOCUMENTS 5,882,646 A * 3/1999 Pusateri et al. ............ 424/755
6,395,315 B1 * 5/2002 Matsuura .................... 426/49
2006/0127996 A1 * 6/2006 Fahey ........................ 435/128

* cited by examiner

Primary Examiner—Johann Richter
Assistant Examiner—Ebenezer Sackey
(74) Attorney, Agent, or Firm—Banner & Witcoff, Ltd.

(57) ABSTRACT

A method for preparing an isothiocyanate product from a cruciferous plant material is disclosed which is capable of stably preparing an isothiocyanate product in a sufficient amount in a high yield by subjecting a natural cruciferous plant material such as wasabi, horseradish, watercress or the like as a starting material to sufficient enzymatic reaction and, in particular, which is capable of stably preparing an isothiocyanate product containing no pungent ingredient in a sufficient amount in a high yield from a natural cruciferous plant material. A cruciferous plant material consisting of pulverized wasabi and/or horseradish was maintained at a temperature of $-3°$ C. to $50°$ C. for a period of time sufficient for effecting enzymatic reaction to thereby form an isothiocyanate product containing allyl isothiocyanate as a pungent ingredient, and then the isothiocyanate product is subjected to a step of drying, distillation, extracting or combination thereof to remove the allyl isothiocyanate from the isothiocyanate product and thereby to obtain isothiocyanate product containing no pungent ingredient. Further, a cruciferous plant material consisting of pulverized watercress is maintained at a temperature of $-3°0$ C. to $50°0$ C. for a period of time sufficient for effecting enzymatic reaction to thereby obtain an isothiocyanate product containing no pungent ingredient in a sufficient amount.

11 Claims, No Drawings

METHOD FOR PREPARING ISOTHIOCYANATE(S) FROM CRUCIFEROUS PLANT MATERIAL

CROSS REFERENCE TO RELATED APPLICATIONS

This application is based upon and claims the benefit of priority from the prior Japanese Patent Application No. 2001-273112, filed Sep. 10, 2001, the entire contents of which are incorporated herein by reference.

BACKGROUND OF THE INVENTION

1. Field of the Invention

The present invention relates to a method for stably preparing an isothiocyanate or isothiocyanate (hereinafter referred to as an isothiocyanate product) in a sufficient amount in a high yield from a natural cruciferous plant material such as wasabi, horseradish, watercress or the like as a starting material by effecting sufficient enzymatic reactions. More particularly, it relates to a method for stably preparing an isothiocyanate product containing no substantial pungent ingredient in a sufficient amount in a high yield from a natural cruciferous plant material.

In the present invention, an isothiocyanate product containing allyl isothiocyanate as a pungent ingredient is referred to as "isothiocyanate (A)"0 and an isothiocyanate product containing no substantial allyl isothiocyanate as a pungent ingredient is referred to as "isothiocyanate (B)".

The isothiocyanate (B) according to the present invention, per se or after processed, is utilized in processed foods containing isothiocyanate (B) which is difficult of ingestion in a large amount and from which the highly irritating pungent ingredient has been removed.

In this specification, "pungent ingredient is removed" means "pungent ingredient is removed to such a degree that a person who ingests isothiocyanate (B) feels no substantial irritation or no irritation at all" and does not necessarily mean "pungent ingredient is completely removed", and likewise, "containing no pungent ingredient" means "containing a pungent ingredient in such a amount that a person who ingests isothiocyanate (B) feels no substantial irritation or no irritation at all" 0 and does not necessarily mean "containing no pungent ingredient at all".

2. Description of the Prior Art

It is known that cruciferous plants such as wasabi, horseradish, watercress and the like are rich in isothiocyanates which exhibit excellent activities as health foods. For example, allyl isothiocyanate and 4-methylsulfinylbutyl isothiocyanate which are contained in wasabi, mustard and the like in large amounts exhibit antibacterial activity and carcinogenesis preventing activity, respectively. It is also known that 6-methylthiohexyl isothiocyanate which is contained in wasabi exhibits platelet aggregation inhibiting activity. Further, it is known that 6-methylsulfinylhexyl isothiocyanate which is one of isothiocyanates contained in wasabi exhibits high GST inducing activity relating to antibacterial activity, carcinogenesis preventing activity and metabolic detoxification activity.

However, isothiocyanates including the above-mentioned 6-methylsulfinylhexyl isothiocyanate are present in wasabi in the form of glucosinolate. Accordingly, in order to make effective use of isothiocyanates, it is necessary that decomposition reaction of glucosinolate be effected by destroying cells of wasabi, for example, grating wasabi.

By grating wasabi, however, allyl isothiocyanate as highly irritating pungent ingredient is formed in a large amount. Accordingly, it is extremely difficult to ingest 6-methylsulfinylhexyl isothiocyanate as an active ingredient in a large amount. Consequently, it is difficult to ingest 6-methylsulfinylhexyl isothiocyanate in such an amount that the activity thereof can be expected.

As mentioned above, it is known that cruciferous plants such as watercress and the like are rich in isothiocyanates. However, isothiocyanates such as 6-methylsulfinylhexyl isothiocyanate is highly reactive with water, ethyl alcohol or the like and is susceptible to heat, oxygen or the like. Accordingly, for example, during cooking, most of 6-methylsulfinylhexyl isothiocyanate degraded. It has been, therefore, difficult to stably provide 6-methylsulfinylhexyl isothiocyanate in a large amount.

SUMMARY OF THE INVENTION

It is, therefore, an object of the present invention to provide a method for preparing an isothiocyanate product which is capable of stably preparing an isothiocyanate product in a sufficient amount in a high yield from a natural cruciferous plant material such as wasabi, horseradish, watercress or the like as a starting material and, in particular, which is capable of stably preparing isothiocyanate (B) containing no pungent ingredient in a sufficient amount in a high yield from the material and, further, which is capable of providing processed isothiocyanate (B) utilizable in processed foods having various activities such as health foods, ordinary foods and the like and, accordingly, which is capable of overcoming the drawbacks inherent in the above-described conventional techniques.

To achieve the above-mentioned object, according to the preparation method of the present invention, a pulverized cruciferous plant material, in particular, pulverized watercress is maintained at a temperature of $-3°$ C. to $50°$ C. for a period of time sufficient for effecting enzymatic reaction, specifically a period of time in a range of 3 minutes to 72 hours to thereby effect sufficient enzymatic reaction and, by virtue of this, to obtain an isothiocyanate product in a sufficient amount, in particular, isothiocyanate (B) containing no pungent ingredient in a sufficient amount.

To achieve above-mentioned object, according further to the preparation method of the present invention, a cruciferous plant material consisting of pulverized wasabi and/or horseradish is maintained at a temperature of $-3°$ C. to $50°$ C. for a period of time sufficient for effecting enzymatic reaction, specifically a period of time in a range of 3 minutes to 72 hours to thereby effect sufficient enzymatic reaction and, as a result, to form isothiocyanate (A) containing volatile allyl isothiocyanate as a pungent ingredient product, and then the isothiocyanate (A) is subjected to a step of ventilation, drying, distillation, extraction or a combination thereof to thereby remove the volatile allyl isothiocyanate from the isothiocyanate (A) and, by virtue of this, to obtain isothiocyanate (B) containing no pungent ingredient.

DETAILED DESCRIPTION OF THE PREFERRED EMBODIMENTS

In the following, the present invention will be specifically described in detail.

The present invention resides in that a natural cruciferous plant material is used as a starting material and subjected to sufficient enzymatic reaction to thereby stably prepare an isothiocyanate product in a sufficient amount in a high yield.

Natural cruciferous plant materials include those which form volatile allyl isothiocyanate as a pungent ingredient by enzymatic reaction and those which form no or a relatively small amount of volatile allyl isothiocyanate by enzymatic reaction. As a representative example of cruciferous plant materials which form no or a relatively small amount of allyl isothiocyanate by enzymatic reaction, watercress may be mentioned. As representative examples of cruciferous plant materials which form allyl isothiocyanate by enzymatic reaction, wasabi and horseradish may be mentioned.

When a cruciferous plant material which forms no or a relatively small amount of allyl isothiocyanate is used as a starting material, watercress is generally used. However, other cruciferous plant materials may be used as a starting material.

Besides the watercress as the representative example of such cruciferous plant materials, the other such cruciferous plant materials, for example, cabbage, broccoli, Brussels sprouts, cauliflower and the like may be mentioned. These materials may be used alone or in combination.

These cruciferous plant materials are pulverized by pulverization in a frozen state, grating in a raw state or other means. The pulverized product is maintained at a temperature of $-3°$ C. to $50°$ C. preferably $5°$ C. to $25°$ C. for a period of time sufficient for effecting enzymatic reaction, preferably a period of time in a range of 3 minutes to 72 hours, more preferably 10 minutes to 10 hours to sufficiently effect enzymatic reaction, thereby forming an isothiocyanate product in a sufficient amount. It is preferred that the enzymatic reaction be effected in a sealed vessel. The isothiocyanate product contains no volatile allyl isothiocyanate as a pungent ingredient and is, specifically, isothiocyanate (B) described below, i.e., ω-methylsulfinylalkyl isothiocyanate, ω-methylthioalkyl isothiocyanate and the like (each alkyl contains 5 to 8 carbon atoms).

When a cruciferous plant material which forms allyl isothiocyanate by enzymatic reaction, i.e., wasabi and/or horseradish (including rhizome, stalk, root and leaf thereof) is used as a starting material, wasabi and/or horseradish (hereinafter simply referred to as "Wasabi") as the starting material is pulverized by pulverization in a frozen state, grating in a raw state or other means. The resulting pulverized Wasabi is maintained at a temperature of $-3°$ C. to $50°$ C. preferably $5°$ C. to $25°$ C. for a period of time sufficient for effecting enzymatic reaction, preferably a period of time in a range of 3 minutes to 72 hours, more preferably 10 minutes to 10 hours to sufficiently effect enzymatic reaction, thereby forming isothiocyanate (A). The enzymatic reaction is carried out in a sealed vessel. When the volume ratio of Wasabi to the vessel is 10% or more, number of bacteria contained in the pulverized Wasabi is reduced by bactericidal effect of allyl isothiocyanate which the pulverized Wasabi itself forms. This is preferable from the viewpoint of food hygiene. For the enzymatic reaction, an aqueous solution of which pH is adjusted to 2 to 10 may be used as a reaction auxiliary.

The above-mentioned period of time sufficient for effecting enzymatic reaction is in a range of 3 minutes to 72 hours, as mentioned above. This is because since formation rates of ω-methylsulfinylalkyl isothiocyanate and the like are low as compared with that of allyl isothiocyanate, the period of time for attaining the maximum amounts of ω-methylsulfinylalkyl isothiocyanate and the like ought to be 1.5 times or more, preferably 1.5 to 2 times the period of time in which allyl isothiocyanate reaches its maximum amount.

The obtained isothiocyanate (A) contains not only isothiocyanates including 6-methylsulfinylhexyl isothiocyanate but also allyl isothiocyanate as a highly irritating pungent ingredient. Since allyl isothiocyanate is highly volatile, the highly volatile allyl isothiocyanate is reduced or removed after completion of the enzymatic reaction by a step of ventilating the vessel, sucking the air in the vessel with a vacuum pump or the like, or a step of drying, distillation, extraction, or a combination thereof to thereby stably form isothiocyanate (B) containing no allyl isothiocyanate in a high yield.

As the above-mentioned ventilation means subsequent to the completion of the enzymatic reaction, there may be used means of ventilating the vessel, means of sucking the air in the vessel with a vacuum pump or the like. As the drying means, means of drying by heating, means of drying under reduced pressure, or the like may be used. As the distillation means, there may be used atmospheric distillation, distillation under reduced pressure, steam distillation or the like. As extraction means, there may be used means of extraction with pentane, hexane, heptane, octane, cyclohexane or a mixture thereof. By these means, allyl isothiocyanate as a pungent ingredient is removed from isothiocyanate (A).

Further, allyl isothiocyanate as a pungent ingredient may be removed from isothiocyanate (A) also by extracting the isothiocyanate (A) with a solvent such as water, ethyl alcohol, methyl alcohol, acetone, ethyl acetate, ethyl ether, dichloroethane, dichloromethane or a mixture thereof, and subsequently subjecting the resulting extract to distillation or chromatography. As the above-mentioned chromatography, there may be mentioned silica gel chromatography, reversed phase chromatography, countercurrent liquid-drop chromatography, high performance liquid chromatography or the like.

Furthermore, two-stage extraction may be employed which comprises extracting the isothiocyanate (A) containing allyl isothiocyanate with a hydrophilic solvent such as water, ethyl alcohol, acetone or the like, and then distilling the extract, and subsequently extracting the distillate with a hydrophobic solvent such as ethyl acetate, ethyl ether, dichloromethane, dichloroethane or the like. By employing the two-stage extraction, formation of emulsion can be prevented which is likely to occur in the course of the extraction with a hydrophobic solvent if the first-stage extraction is not carried out, and accordingly, yield and purity of isothiocyanate (B) containing no pungent ingredient is raised.

Specifically, the thus formed isothiocyanate (B) containing no allyl isothiocyanate include ω-methylsulfinylalkyl isothiocyanate (the alkyl group has 5 to 8 carbon atoms), ω-methylthioalkyl isothiocyanate (the alkyl group has 5 to 8 carbon atoms) and the like.

More specifically, ω-methylsulfinylalkyl isothiocyanate (the alkyl group has 5 to 8 carbon atoms) includes 5-methylsulfinylpentyl isothiocyanate, 6-methylsulfinylhexyl isothiocyanate, 7-methylsulfinylheptyl isothiocyanate and 8-methysulfinyloctyl isothiocyanate. These are formed in such a manner that one of them is formed alone, or two or more of them are formed concurrently. Of these, particularly effective isothiocyanate is 6-methylsulfinylhexyl isothiocyanate.

Likewise, ω-methylthioalkyl isothiocyanate (the alkyl group has 5 to 8 carbon atoms) includes 5-methylthiopentyl isothiocyanate, 6-methylthiohexyl isothiocyanate, 7-methylthioheptyl isothiocyanate and 8-methylthiooctyl isothiocyanate. These are formed also in such a manner that one of them is formed alone, or two or more of them are formed concurrently.

The thus prepared isothiocyanate (B) containing no allyl isothiocyanate, per se or after subjected to health-directed processing treatment such as fermentation treatment, concentration, powdering or mixing in an edible oil, is utilized in health-directed foods or beverages, or ordinary foods such as juices, snacks, seasonings, flavoring oils or the like. The health-directed foods include those in the form of tablets, capsules and the like as well as those in the form of foods in general. As in the case of the isothiocyanate (B), the isothiocyanate product containing no allyl isothiocyanate which is derived from watercress may be subjected to the same processing as described above and thereby utilized in processed foods in the form of health-directed foods or beverages, or ordinary foods such as juices, snacks, seasonings, flavoring oils or the like.

The above-mentioned processing treatment is described in detail. As the processing treatment, there may be used drying treatment, fermentation treatment, extraction treatment or the like as well as a customary processing treatment such as mixing with wheat flour and baking the resulting mixture, mixing in a beverage or the like. As the drying treatment, there may be mentioned through-flow drying, hot-air drying, drying under reduced pressure, freeze drying, vacuum drying, spray drying or the like. As the fermentation treatment, there may be mentioned that using at least one member selected from the group consisting of koji mold (*Aspergillus*), lactic acid bacteria and yeasts. As the extraction treatment, there may be mentioned a treatment which extracts active ingredients from the isothiocyanate (B) containing no allyl isothiocyanate with a solvent selected from the group consisting of acetone, ethyl acetate, ethyl ether, ethyl alcohol, methyl alcohol, dichloromethane, dichloroethane, hexane, water and mixtures thereof. In this case, the extract per se may be used as a processed food or the extract is concentrated, powdered, desired or mixed in an edible oil to prepare a processed food.

The processed foods obtained by the above-mentioned processing treatment are health-directed foods or beverages, or ordinary foods such as juices, snacks, seasonings, flavoring oils or the like.

In the following, the present invention will be described more in detail with reference to specific Examples.

EXAMPLE 1

1.0 kg of wasabi was frozen, and the wasabi in the frozen state was pulverized. The pulverized wasabi was placed in a sealed vessel made of glass (volume: 5.7 liter) and allowed to stand at 10° C. for 24 hours to effect enzymatic reaction. Then, the product was spread in a hot-air dryer and dried at 50° C. for 6 hours. The resulting dried product was pulverized. From the resultant, powdery product of 20 mesh-pass was collected and tableted to prepare tablets (diameter: 7 mm, weight: 1.5 g).

(Result)

A specimen prepared by pulverizing the tablets was analyzed by high performance liquid chromatography (HPLC). As a result, it was found that 6-methylsulfinylhexyl isothiocyanate was contained in an amount of 3.0 mg/g, and that a natural foodstuff was obtained of which 6-methylsulfinylhexyl isothiocyanate content was about 10 times as compared with that of grated wasabi. Further, allyl isothiocyanate as a pungent ingredient was not detected. According also to evaluations in organoleptic test, no substantial irritation was sensed. Therefore, the specimen was found to be a good foodstuff.

Subsequently, analyses was carried out with respect to amount of formed pungent ingredient in accordance with the following methods.

Conversion into Thiourea Method: 1 g of the same specimen as the above-mentioned specimen was mixed in 200 ml of distilled water. The resultant was charged into a steam distillation device, and allyl isothiocyanate as a pungent ingredient was steam-distilled. The distillation was continued until the amount of the distillate reached about 100 ml while receiving the distillate in a receptacle containing 4 ml of a mixed liquid of ammonia and ethyl alcohol (ammonia:ethyl alcohol=1:1). At this stage, allyl isothiocyanate was reacted with ammonia and converted into allylthiourea. The resulting distillate was increased in quantity to 200 ml, and absorbance thereof was determined at a wavelength of 237 nm. The amount of allylthiourea was calculated on the basis of a separately prepared calibration curve and, from the result, the amount of allyl isothiocyanate contained in the specimen was calculated. This method is a relatively rapid analytical method. According to the analysis, allyl isothiocyanate was not detected from the specimen.

Gas-Chromatographic Analytical Method To 20 g of the same specimen as the above-mentioned specimen, 100 μl of 0.3 mg/ml ethyl undecanoate solution was added as an internal standard. The specimen was extracted twice with 30 ml of diethyl ether. The resulting extract was dehydrated with mirabilite and then concentrated to 1 ml. The resulting concentrate was analyzed by means of gas chromatography (GC). The surface areas of the peaks of isothiocyanates relative to the internal standard substance were analyzed and calculated. Separately, each of predetermined amounts of referential products of isothiocyanates was dissolved in 1 ml of diethyl ether, and the same internal standard solution was added thereto in the same manner as above. Each resultant was subjected to gas-chromatographic analysis, and the surface area of the peak relative to the internal standard substance was calculated to prepare a calibration curve. By using the thus prepared calibration curve, isothiocyanates contained in the specimen could be quantitatively analyzed with high precision. The internal standard method in which an internal standard substance is added is general means for correcting experimental operation errors. This analytical method is lacking in rapidity but suitable for precise experiment. According also to this analytical method, allyl isothiocyanate was not detected from the specimen.

EXAMPLE 2

1.0 kg of wasabi was frozen, and the frozen wasabi was pulverized. The pulverized wasabi was placed in a sealed vessel made of glass and allowed to stand at 40° C. for 1 hour to effect enzymatic reaction. After completion of the reaction, the air in the vessel was sucked to thereby remove most of allyl isothiocyanate as a volatile ingredient. Into the vessel, 5 liter of acetone was poured. The resultant was stirred for 1 hour and filtered to obtain an extract. The extract was concentrated to obtain 55 g of a concentrate. The concentrate was adsorbed on 100 g of dextrin and dried to obtain a powdery material.

(Result)

The obtained powder contained 6-methylsulfinylhexyl isothiocyanate in an amount of 2.7 mg/g, that is to say, a foodstuff was obtained which had a high content of. 6-methylsulfinylhexyl isothiocyanate.

EXAMPLE 3

1.0 kg of frozen rhizomes of sawa-wasabi were grated, and portions thereof were maintained at temperatures of −10° C., −3° C., 5° C., 10° C., 25° C. and 37° C. respectively, and allowed to stand for 3 hours in an open system. 20 g of a specimen was taken from each of the portions, and 30 ml of ethyl ether was added to the specimen. The mixture was sufficiently shaken to blend them well. The resulting mixture was centrifuged at 3,000 rpm for 10 minutes. The supernatant was collected and concentrated to 1.0 ml. The concentrate was subjected to gas chromatography to carry out analysis. On the basis of separately prepared calibration curves, contents of allyl isothiocyanate and 6-methylsulfinylhexyl isothiocyanate in terms of percentage by weight were determined. The results are shown in Table 1. As Comparative Example, wasabi was grated at room temperature, and 5 minutes later, analysis was carried out. The results are shown in Table 1.

TABLE 1

|  | allyl isothiocyanate content | 6-methylsulfinyl-hexyl isothiocyanate content | 6-methylsulfinyl-hexyl isothiocyanate/ allyl isothiocyanate ratio |
| --- | --- | --- | --- |
| Comp. Ex. | 0.19% | 0.032% | 0.17 |
| −10° C. | lower than 0.002% | lower than 0.002% | — |
| −3° C. | 0.12% | 0.015% | 0.13 |
| 10° C. | 0.03% | 0.036% | 1.2 |
| 37° C. | 0.01% | 0.035% | 3.5 |

(Result)

It is apparent from Table 1 that the content of 6-methylsulfinylhexyl isothiocyanate was increased when the specimen was allowed to stand at a temperature of −3° C. or higher. It is also apparent from Table 1 that as the temperature becomes higher, the content of allyl isothiocyanate as a pungent ingredient becomes lower due to volatilization thereof, and that this enables ingestion of 6-methylsulfinylhexyl isothiocyanate in a larger amount with less irritation.

EXAMPLE 4

0.5 kg of frozen rhizomes of sawa-wasabi were grated, and grated sawa-wasabi was allowed to undergo enzymatic reaction in an open atmosphere at 25° C. for 3 hours. To the reaction product, 0.75 kg of ethyl alcohol was added. The mixture was sufficiently stirred and centrifuged at 3,000 rpm for 10 minutes, and the supernatant was collected. The same procedure was conducted once more, and 1.2 kg of the supernatant was obtained. To the supernatant, 20 ml of oil was added. The ethyl alcohol was removed by means of an evaporator to transfer the ingredients contained in the ethyl alcohol extract to the oil. The edible oil containing 6-methylsulfinylhexyl isothiocyanate was thereby obtained.

(Result)

The obtained oil was analyzed by high performance liquid chromatography. As a result, 0.604 mg/ml of 6-methylsulfinylhexyl isothiocyanate was detected, but allyl isothiocyanate was not detected. The foodstuff was obtained which had the content of 6-methylsulfinylhexyl isothiocyanate as high as about twice that of ordinary wasabi and the reduced content of the pungent ingredient.

EXAMPLE 5

Rhizomes of wasabi frozen with liquid nitrogen were pulverized to prepare pulverized frozen wasabi. 1 kg of the pulverized frozen wasabi was maintained at a temperature of 25° C. for 3 hours to form 6-methylsulfinylhexyl isothiocyanate in the maximum amount. 2 liter of acetone was added thereto, and extraction was conducted under stirring at room temperature for 30 minutes. The extract was then filtered under reduced pressure to effect solid-liquid separation. 2 liter of acetone was added to the resulting residue, and the same procedure was repeated to carry out extraction and solid-liquid separation. The collected extract was concentrated under reduced pressure by means of an evaporator. The concentration under reduced pressure was conducted to distill off acetone and to leave water derived from the wasabi and further continued until allyl isothiocyanate was removed to obtain 500 ml of concentrate.

Further, 0.5 liter of ethyl acetate was added to the concentrate, and extraction was conducted under stirring at room temperature for 30 minutes. This procedure was repeated twice in total to obtain 0.9 liter of ethyl acetate extract. The ethyl acetate extract was dehydrated with mirabilite and then concentrated under reduced pressure by means of an evaporator to obtain 16 g of ethyl acetate extract.

Separately from the above experiment, an experiment was carried out in which wasabi was extracted directly with ethyl acetate. Specifically, 1 kg of pulverized frozen wasabi was kept at a temperature of 2° C. for 3 hours and then extracted twice with 2 liter of ethyl acetate. 1.2 liter of the collected ethyl acetate extract wan dehydrated with mirabilite and then concentrated under reduced pressure by means of an evaporator to obtain 8 g of ethyl acetate extract.

In these experiments, the yield of each of the extracts and the content of 6-methylsulfinylhexyl isothiocyanate in each of the obtained extracts were determined. The results are shown in Table 2.

TABLE 2

|  | yield (solid content) | content of 6-methylsulfinyl-hexyl isothiocyanate (in solid content) |
| --- | --- | --- |
| extracted with acetone | 5.7% | 0.87% |
| extracted with acetone and then extracted with ethyl acetate | 1.6% | 2.71% |
| extracted directly with ethyl acetate | 0.8% | 2.0% |

It is apparent from the results shown in Table 2 that the method comprising extraction with acetone as a hydrophilic solvent, followed by extraction with ethyl acetate is superior to the method comprising extraction directly with ethyl acetate as a hydrophobic solvent in terms of both the yield and the content of 6-methylsulfinylhexyl isothiocyanate, i.e., in terms of purity. The prime cause of this is that emulsion was generated in the case where extraction was carried out directly with ethyl acetate, thereby lowering the yield.

It is further apparent that as compared with the stage at which only the extraction with acetone was carried out, the further extraction with ethyl acetate increased the content of 6-methylsulfinylhexyl isothiocyanate. Incidentally, since the pungent ingredient was volatilized in the course of the concentration of the acetone extract, amounts of the pungent ingredient contained in the resulting acetone extract and in the ethyl acetate extract obtained by further subjecting the acetone extract to the extraction with ethyl acetate were reduced to such an degree that no substantial irritation was sensed.

EXAMPLE 6

Rhizomes of wasabi in a frozen state which had been frozen with liquid nitrogen and then stored were pulverized to obtain pulverized frozen wasabi. Specimens thereof were thawed and incubated at temperatures of −3° C., 5° C., 10° C., 25° C., 37° C. and 50° respectively. In this connection, when the pulverized frozen wasabi was kept at a temperature lower than −3° C. the pulverized frozen wasabi remained in the frozen state. Each of the specimens was sampled at predetermined intervals, the samples were extracted with diethyl ether and concentrated. The amounts of the thus formed 6-methylsulfinylhexyl isothiocyanate and allyl isothiocyanate as a pungent ingredient were determined by gas chromatography. The results are shown in Table 3.

TABLE 3

| incubation temp. | period of time in which amount of 6-methylsulfinyl-hexyl isothiocyanate reached the maximum | period of time in which amount of allyl isothiocyanate reached the maximum |
| --- | --- | --- |
| −3° C. | 7 hours | 3 hours |
| 0° C. | 2 hours | 1 hour |
| 10° C. | 1 hour | 30 minutes |
| 25° C. | 30 minutes | 15 minutes |
| 37° C. | 10 minutes | 5 minutes |
| 50° C. | 5 minutes | 3 minutes |

It is apparent from Table 3 that the amount of 6-methylsulfinylhexyl isothiocyanate gradually increased at any of the temperatures and reached the maximum after the shown period of time. Among the maximum amounts, there were no great differences. With respect also to allyl isothiocyanate, the sane phenomena were observed. The lower the temperature, the longer the period of time in which the amount reached the maximum. The higher the temperature, the shorter the period of time in which the amount reached the maximum.

EXAMPLE 7

Rhizomes of wasabi which had been frozen with liquid nitrogen and then stored for one year were pulverized. Specimens thereof were thawed and incubated at temperatures of −3° C. 10° C. and 25° C. respectively, to form 6isothiocyanate and allyl isothiocyanate in the same manner as in Example 6. The amounts of the obtained 6-methylsulfinylhexyl isothiocyanate and allyl isothiocyanate were determined in the same manner as in Example 6. The results are shown in Table 4.

TABLE 4

| incubation temp. | period of time in which amount of 6-methylsulfinyl-hexyl isothiocyanate reached the maximum | period of time in which amount of allyl isothiocyanate reached the maximum |
| --- | --- | --- |
| 3° C. | 72 hours | 24 hours |
| 10° C. | 18 hours | 8 hours |
| 25° C. | 3 hours | 1 hour |

As is apparent from Table 4, the periods of time in which the amounts of each of the isothiocyanates reached the maximum were longer as compared with the results shown in Table 3. This was because deactivation of enzyme in the wasabi occurred during the storage in the frozen state, and in consequence, ability of the enzyme to form isothiocyanates lowered. However, there were no great difference between the amounts of the formed 6-methylsulfinylhexyl isothiocyanate in this case and those in the case where the starting material which had been stored for a shorter period of time was used.

EXAMPLE 8

100 g of rhizomes of wasabi in a frozen state were pulverized. The pulverized frozen wasabi was placed in a sealed vessel (volume: 300 ml) made of glass and allowed to stand at 25° C. for 3 hours to effect enzymatic reaction. Then, 300 ml of hexane was added thereto, and extraction was carried out for 1 hour while gently stirring. Thereafter, the hexane extract was removed by centrifugation. Then, 300 ml of hexane was added to the residue, and extraction and centrifugal separation were carried out in the same manner. The resulting residue was distilled under reduced pressure by means of an evaporator to remove the remaining hexane. Further, the residue was freeze-dried to obtain 25.8 g of dried product.

The dried powdery product was organoleptically evaluated, and as a result, no substantial irritation was sensed. This was because allyl isothiocyanate was extracted by extraction with hexane and removed. Further, the dried powder was extracted with diethyl ether and analyzed by gas chromatography. As a result, it was found that 6-methylsulfinylhexyl isothiocyanate was contained in an amount of 3.3 mg per 1 g of the dried powder.

EXAMPLE 9

1 kg of rhizomes of wasabi in a frozen state were pulverized. The pulverized frozen wasabi was placed in a sealed vessel (volume: 2 liter) made of a stainless steel and allowed to stand at 25° C. for 3 hours to effect enzymatic reaction. The resulting product was spread over a 50 cm-square tray and allowed to stand in a hot-air dryer at 50° C. for 1 hour to discharge a pungent ingredient. 3 liter of water was added to the wasabi from which the pungent ingredient was removed, and extraction was carried out at room temperature for 1 hour while stirring. Then, the resultant was subjected to pressure filtration with a pressure filter to obtain extract. The sate procedure was repeated again to obtain 5.6 liter of the extract in total. The extract was concentrated to an amount of about one twentyth, and then the concentrate was spray-dried with a spray dryer to obtain 55 g of a dried powder.

2 ml of water was added to 0.5 g of the dried powder, and extraction was carried out with diethyl ether. The extract was analyzed by gas chromatography. As a result, it was found that 6-methylsulfinylhexyl isothiocyanate was contained in an amount of 10.9 mg per 1 g of the dried powder.

EXAMPLE 10

1 kg of rhizomes of wasabi in a frozen state were pulverized. The pulverized frozen wasabi was placed in a sealed vessel (volume: 2 liter, equipped with a closable ventilation hole) made of a stainless steel and allowed to stand at 25 for 3 hours to effect enzymatic reaction. Then, the resulting product was allowed to stand for 1 hour while sucking the air in the vessel through the ventilation hole by means of a vacuum pump to discharge a pungent ingredient. Into the wasabi from which the pungent ingredient was removed, lactic acid bacteria (*Lactobacillus casei*, *Lactobacillus plantarm*) and koji mold (*Aspergillus oryzae*) were inoculated each in 1/1,000 amount. The inoculated wasabi was mixed well and allowed to stand at 30° C. for 48 hours to effect incubation. A food having a miso(fermented soybean paste)-like characteristic savor was thereby obtained.

The fermented product was extracted with diethyl ether, and the extract was analyzed by gas chromatography. As a result, it was found that 6-methylsulfinylhexyl isothiocyanate was contained in an amount of 0.18 mg per 1 g of the fermented product.

EXAMPLE 11

200 g of watercress frozen with liquid nitrogen was pulverized. The pulverized frozen watercress was placed in a vessel (volume: 300 ml) made of glass and allowed to stand at 25 for 3 hours to effect enzymatic reaction. Then, the resulting product was freeze dried to obtain 18.9 g of a dried product. The dried product was pulverized to obtain a dried powder.

The dried powder was extracted with diethyl ether, and the extract was analyzed by gas chromatography. As a result, it was found that 7-methylsulfinylheptyl isothiocyanate was contained in an amount of 1.1 mg per 1 g of the dried powder.

As described above, according to the preparation method, of the present invention, isothiocyanate (B) can stably be prepared in a sufficient amount in a high yield by subjecting a natural cruciferous plant material, in particular, watercress as a starting material to prescribed enzymatic reaction.

Further, according to the preparation method of the present invention, isothiocyanate (A) (containing volatile allyl isothiocyanate as a pungent ingredient) is first formed from a cruciferous plant material consisting of wasabi and/or horseradish as a starting material, and then the above-mentioned allyl isothiocyanate is removed from the isothiocyanate (A) by ventilation or suction to prepare isothiocyanate (B) containing no substantial pungent ingredient. Accordingly, isothiocyanates containing no substantial pungent ingredient can stably be prepared in a high yield.

By subjecting the isothiocyanates containing no substantial pungent ingredient and the isothiocyanate (B) from which allyl isothiocyanate was substantially removed which are obtained by the above-described preparation methods to a processing treatment such as drying, fermentation, extraction or the like, the resulting products are utilized in various processed foods containing isothiocyanates from which the pungent ingredient was removed, for example, health-directed foods or beverages, or ordinary foods such as juices, snacks, seasonings, flavoring oils or the like.

What is claimed is:

1. A method for preparing an isothiocyanate product from a cruciferous plant material consisting of pulverized wasabi, horseradish, or combination thereof, said method comprising:
    maintaining the pulverized cruciferous plant material at a temperature of −3° C. to 50° C. for a period of time sufficient for effecting enzymatic reaction to thereby form an isothiocyanate product containing allyl isothiocyanate as a pungent ingredient, and then
    subjecting the isothiocyanate product to a step of drying, distillation, extracting or combination thereof to remove the allyl isothiocyanate from the isothiocyanate product and thereby to obtain isothiocyanate product containing no pungent ingredient.

2. The method for preparing an isothiocyanate product from a cruciferous plant material according to claim 1 wherein the period of time sufficient for effecting enzymatic reaction is in a range of 3 minutes to 72 hours.

3. The method for preparing an isothiooyanate product from a cruciferous plant material according to claim 1 wherein the isothiocyanate product containing allyl isothiocyanate is extracted with a solvent selected from the group consisting of pentane, hexane, heptane, octane cyclohexane and mixtures thereof to obtain isothiocyanate product containing no pungent ingredient.

4. The method for preparing an isothiocyanate product from a cruciferous plant material according to claim 1 wherein the isothiocyanate product containing allyl isothiocyanate is extracted with a solvent selected from the group consisting of water, ethyl alcohol, methyl alcohol, acetone, ethyl acetate, ethyl ether, dichioroethane, dichloromethane and mixtures thereof, and then the resulting extract is subjected to distillation or chromatography to thereby remove allyl isothiocyanate from the isothiocyanate product.

5. The method for preparing an isothiocyanate produot from a cruciferous plant material according to claim 1 wherein the isothiocyanate product containing allyl isothiocyanate is extracted with a hydrophilic solvent selected from the group consisting of water, ethyl alcohol and acetone, and then the extract is distilled, and subsequently, the distillate is extracted with a hydrophobic solvent selected from the group consisting of ethyl acetate, ethyl ether, dichloromethane and dichloroethane to obtain an isothiocyanate product containing no pungent ingredient.

6. The method for preparing an isothiocyanate product from a cruciferous plant material according to claim 1, said method further comprising:
    subjecting the isothiocyanate product containing no pungent ingredient to fermentation treatment with at least one microorganism selected from the group consisting of koji mold, acetic acid bacteria, yeasts and combinations thereof to obtain a processed food.

7. The method for preparing an isothiocyanate product from a cruciferous plant material according to claim 1 wherein the isothiocyanate product containing no pungent ingredient, per se or after concentrated, powdered or mixed in an edible oil, is used in a processed food.

8. The method for preparing an isothiocyanate product from a cruciferous plant material according to claim 1 wherein the isothiocyanate product containing no pungent ingredient comprises 6-methylsulfinylhexyl isothiocyanate.

9. The method for preparing an isothiocyanate product from a cruciferous plant material according to claim 1 wherein the isothiocyanate product containing no pungent ingredient comprises at least one member selected from the group consisting of 5-methylsulfinylpentyl isothiocyanate, 7-methylsulfinylheptyl isothiocyanate and 8-methysulfinyloctyl isothiocyanate.

10. The method for preparing an isothiocyanate product from a cruciferous plant material according to claim 1 wherein the isothiocyanate product containing no pungent ingredient comprises at least one member selected from the group consisting of 5-methythiopentyl isothiocyanate, 6-methylthiohexyl isothiocynate, 7-methylthioheptyl isothiocyanate and 8-methylthiooctyl isothiocyanate.

11. The method for preparing an isothiocyanate product from a cruciferous plant material according to claim 1 wherein the isothiocyanate product containing no pungent ingredient is subjected to drying, fermentation or extraction treatment to obtain a processed food.

* * * * *

UNITED STATES PATENT AND TRADEMARK OFFICE
CERTIFICATE OF CORRECTION

PATENT NO.       : 7,232,583 B2                                   Page 1 of 1
APPLICATION NO.  : 10/234839
DATED            : June 19, 2007
INVENTOR(S)      : Mitsuyoshi Murata et al.

It is certified that error appears in the above-identified patent and that said Letters Patent is hereby corrected as shown below:

Title page, Abstract, Item (57)
    Please delete "50°0 C." and insert --50° C--
    Please delete "-3°0 C to 50°0 C" and insert -- -3° C to 50° C --

In Claim 3, Column 12, Line 3:
    Please delete "isothiooyanate" and insert --isothiocyanate--

In Claim 5, Column 12, Line 19:
    Please delete "produot" and insert --product--

Signed and Sealed this

Fourth Day of March, 2008

JON W. DUDAS
*Director of the United States Patent and Trademark Office*